US007260307B2

(12) United States Patent
Lin et al.

(10) Patent No.: US 7,260,307 B2
(45) Date of Patent: Aug. 21, 2007

(54) METHOD AND SYSTEM FOR GENERATING A USER INTERFACE FOR DIGITAL TELEVISIONS

(75) Inventors: Shu Lin, Indianapolis, IN (US); Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1188 days.

(21) Appl. No.: 10/020,790

(22) Filed: Dec. 14, 2001

(65) Prior Publication Data

US 2003/0113093 A1 Jun. 19, 2003

(51) Int. Cl.
H04N 5/91 (2006.01)
(52) U.S. Cl. .......................................... 386/46; 386/111
(58) Field of Classification Search .................. 386/1, 386/46, 52, 55, 64, 65, 83, 111, 112, 125, 386/126; 348/552, 558, 563–569, 589, 600, 348/722; 345/722, 228, 328, 564, 720, 734; 375/240.26

See application file for complete search history.

(56) References Cited

U.S. PATENT DOCUMENTS

| | | | | |
|---|---|---|---|---|
| 5,936,667 | A | * | 8/1999 | Saib et al. .................. 348/180 |
| 6,005,562 | A | * | 12/1999 | Shiga et al. ................ 715/721 |
| 6,034,738 | A | * | 3/2000 | Sparks ........................ 348/564 |
| 6,609,253 | B1 | * | 8/2003 | Swix et al. .................... 725/88 |
| 6,758,540 | B1 | * | 7/2004 | Adolph et al. ......... 375/240.26 |
| 6,788,710 | B1 | * | 9/2004 | Knutson et al. ............. 370/535 |
| 7,050,700 | B2 | * | 5/2006 | Ishikawa ...................... 386/69 |
| 7,200,325 | B2 | * | 4/2007 | Tsumagari et al. ............ 386/95 |

FOREIGN PATENT DOCUMENTS

| | | |
|---|---|---|
| EP | 0 980 185 | 2/2000 |
| WO | WO97/10678 | 3/1997 |
| WO | WO 00/14967 | 3/2000 |

* cited by examiner

Primary Examiner—Thai Q. Tran
Assistant Examiner—Mishawn Dunn
(74) Attorney, Agent, or Firm—Joseph J. Laks; Robert D. Shedd; Paul P. Kiel

(57) ABSTRACT

A method (200) and apparatus (100) for displaying in a remote display device a user command, or status information, in a digitally encoded video signal containing a plurality of pictures transmitted from the apparatus to a remote display device. The method comprises the steps of: generating (216 or 220) at least one digitally encoded indicia representing the user command, or status information; and in response to the user command, modifying (218) at least one picture from a plurality of pictures being sent to the display device for decoding and display by replacing at least a portion of the picture with the digitally encoded indicia such that the indicia is decoded and displayed (220) when the picture is decoded and displayed by the display device. The method can further include reading the digitally encoded signal from a storage medium contained in the apparatus, and the generating step and the modifying step can be performed during the reading step. Alternatively, the generating step can be performed prior to the reading step.

17 Claims, 3 Drawing Sheets

METHOD AND SYSTEM FOR GENERATING A USER INTERFACE FOR DIGITAL TELEVISIONS

BACKGROUND OF THE INVENTION

1. Technical Field

The inventive arrangements relate generally to video playback and recording systems and more particularly to video playback and recording systems that produce video signals for display on display devices.

2. Description of Related Art

Digital televisions (DTV) and high-definition televisions (HDTV) are gaining popularity in today's consumer electronics marketplace. Many purchasers of these types of televisions also buy digital video playback or recording systems such as digital video disc (DVD) recorders or DVD players for purposes of viewing previously recorded programs or recording their favorite programs. Notably, the combination of a DTV (or an HDTV) and a playback or recording system can be an integral part of a home theater entertainment system.

A digital video playback or recorder system typically contains an MPEG decoder to decode the digitally encoded multimedia data that is stored on the discs that the recorder plays. If the digital video playback or recorded system is connected to a conventional (non-DTV or non-HDTV) television, the digitally encoded signal will be decoded by the playback or recorder system's MPEG decoder before being displayed on the conventional television. Significantly, however, most DTV's contain their own MPEG decoders. As such, if a playback or recorder system is connected to a DTV, the system may be arranged such that the encoded digital video signal read from the system storage disc is transmitted to and remotely decoded by the DTV's decoder.

There is, however, an important disadvantage to decoding digitally encoded signals with a remote DTV decoder. Namely, it is very difficult to provide on screen display (OSD) in this type of arrangement. Generally, DVD recorders and conventional televisions contain complementary circuitry for generating OSD signals. An OSD is a user interface that can by overlaid over program images to notify a user of certain digital playback or recorder system functions. For example, if the DVD recorder is performing a fast-forward trick mode at three times (3×) the normal playback speed, the OSD can display this information on the screen of the conventional television as the trick mode is carried out.

There are several reasons why OSD signal generation is hindered by the playback or recorder system/DTV arrangement discussed above. First, it is difficult to generate the OSD signals at the DTV because the decoder of the DTV is remotely located from the playback or recorder system, and as such, the DTV is generally unaware of the functions being performed by these systems. Also, generating the OSD signal at the playback or recorder device and incorporating an OSD signal into the bitstream being transferred to the DTV may cause this bitstream to exceed the bandwidth limit between the playback or recorder system and the DTV. Thus, a need exists for a method and system for generating and displaying OSDs indicative of the functions being performed by a device that may be remote from the display device without increasing system costs or complexity.

SUMMARY OF THE INVENTION

The present invention provides a method of generating and sending to a remote display device having a decoder therein a user command, or status information, in a digitally encoded video signal containing a plurality of pictures, which includes one or more modified pictures. The method includes the steps of: generating at least one digitally encoded indicia representing the user command, or status information; and modifying at least one picture from the plurality of pictures being sent to the display device by replacing at least a portion of the picture with the digitally encoded indicia such that the indicia is decoded and displayed when the picture is decoded and displayed by the remote display device.

In one arrangement, the method can further include the step of reading the digitally encoded signal from a storage medium contained in the apparatus, and the generating step and the modifying step can be performed during the reading step. Alternatively, the generating step can be performed prior to the reading step, and the modifying step can be performed during the reading step. The generating step may be followed in this case by the step of storing the digitally encoded indicia in a storage device and accessing the indicia and modifying the picture in response to the user command, or an event that requires the display of the status information. In either embodiment, at least a portion of the indicia can be comprised of intra macroblocks. In the arrangement where the generating step can be performed prior to the reading step, the indicia can be stored in a table to be accessed during the modifying step.

Additionally, in either embodiment, the picture can be a bidirectional predictive picture. The bidirectional predictive picture can contain a plurality of slices in which each slice can contain a plurality of picture macroblocks. Also, the portion of the bidirectional predictive picture that is replaced by the intra macroblocks that comprise the indicia can be a predetermined number of the plurality of picture macroblocks in at least one of the plurality of slices. Moreover, at least one of the plurality of picture macroblocks in at least one of the plurality of slices, which is replaced by one of the intra macroblocks that comprise the indicia, is located at the end of that picture macroblock's corresponding slice.

The present invention also provides an apparatus for generating and transmitting to a remote display device a digitally encoded a video signal containing a plurality of pictures, including pictures modified to include digitally encoded indicia of a user command, or status information, the digitally encoded video signal being decoded and displayed by the remote display device. The apparatus comprises: a signal input for receiving a digitally encoded video signal representative of a plurality of pictures; a generator for generating a digitally encoded indicia representing a user command, or status information associated with the apparatus; a processor, coupled to the generator for modifying, in response to the user command, or an event that requires displaying the status information, at least one picture from the plurality of pictures in the encoded digital video signals by replacing at least a portion of the picture with the digitally encoded indicia such that the indicia is decoded and displayed when the picture is decoded and displayed on the display device; and a signal output for transmitting an output signal including the digitally encoded video signal having the modified picture to the remote display device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3A is a slice in a bidirectional predictive picture in which the slice contains a plurality of macroblocks in accordance with the inventive arrangements.

FIG. 3B is another slice in a bidirectional predictive picture in which the slice contains a plurality of macroblocks in accordance with the inventive arrangements.

The exemplifications set out herein illustrate preferred embodiments of the invention, and such exemplifications are not to be construed as limiting the scope of the invention in any manner.

DETAILED DESCRIPTION

Figure 1:
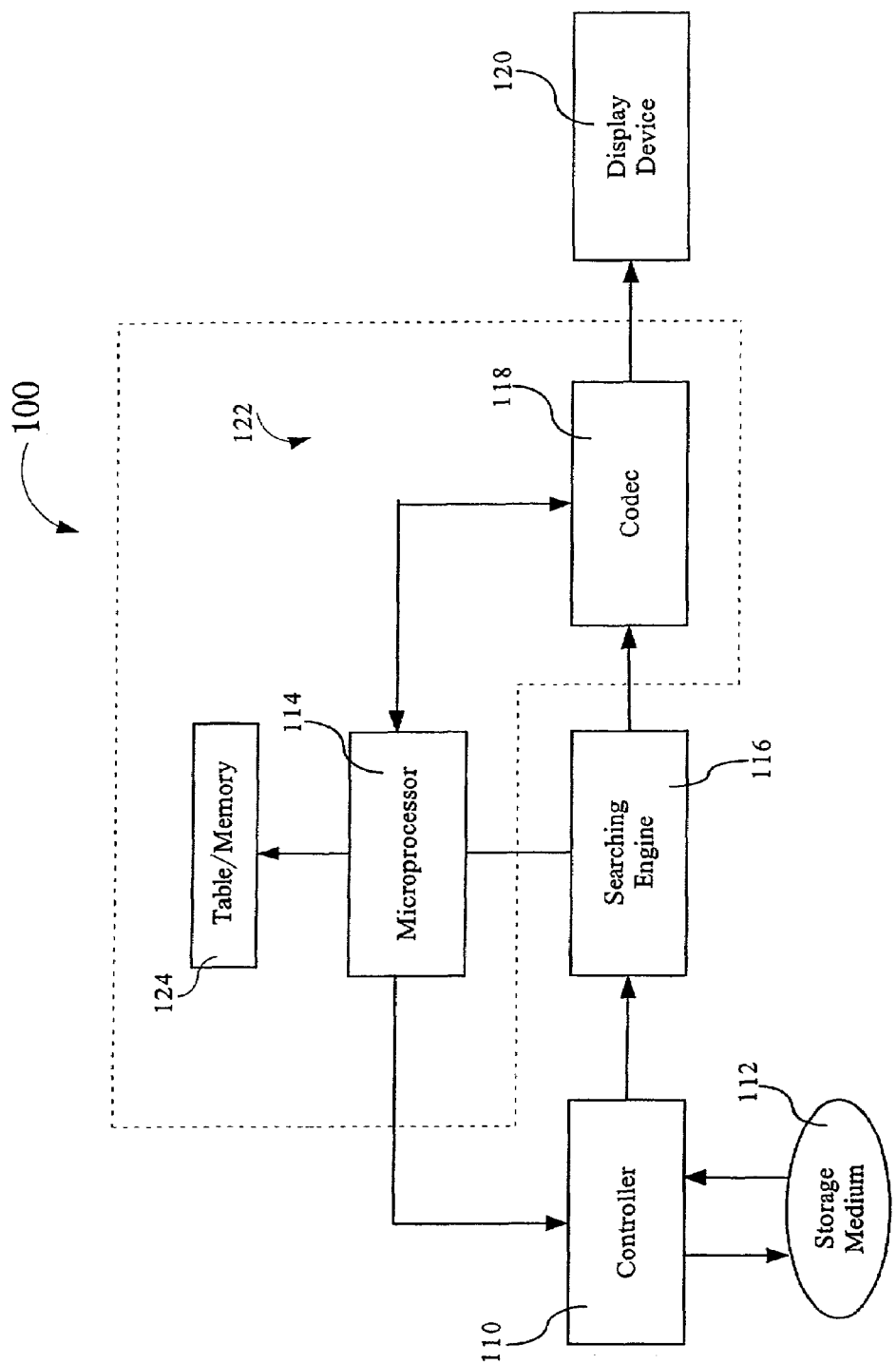
FIG. 1 is a block diagram of a system that can generate a user interface for digital televisions in accordance with the inventive arrangements herein.

A system 100 for implementing the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. This includes any digital video playback or recorder system. In addition, system 100 is not limited to reading data from or writing data to any particular type of storage medium, as any storage medium capable of storing digitally encoded data can be used with system 100, such as optical media and hard disk drives.

The system 100 includes controller 110 for reading data from and writing data to a storage medium 112. System 100 also includes microprocessor 114, searching engine 116, coder/decoder (codec) 118, display device 120 and table or memory 124. The codec 118 contains suitable software and circuitry for encoding and decoding video signals, including signals that are read from the storage medium 112, or are generated in generator 122. Control and data interfaces can also be provided for permitting microprocessor 114 to control the operation of controller 112, the searching engine 116 and the codec 118 and for enabling microprocessor 114 to access the table 124. Suitable software or firmware can be provided in memory for the conventional operations performed by microprocessor 114. Further, program routines can be provided for microprocessor 114 in accordance with the inventive arrangements. It should be understood that all or portions of microprocessor 114, codec 118 and table 124 can be considered to form generator 122 within contemplation of the present invention.

In operation, controller 110 can read a digitally encoded video signal containing a plurality of pictures from storage medium 112. Microprocessor 114 can receive a user command, and the video signal can be sent to searching engine 116. Searching engine 116 can then search the video signal for a suitable picture that can be modified for inserting an OSD signal. Once a suitable picture is located, searching engine 116 signals microprocessor 114, and microprocessor 114 and codec 118 generate a digitally encoded indicia representative of the user command, or status information, which can be used to replace at least a portion of the picture. As such, the digitally encoded indicia representative of the user command can be generated as the encoded video signal is read from storage medium 112.

In an alternative arrangement, microprocessor 114 can instruct codec 118 to generate one or more digitally encoded indicia representative of one or more user commands or status information. The generated indicia can then be stored in table 124, which microprocessor 114 can access when necessary. Once microprocessor 114 receives a user command, or an event that requires the display of status information, microprocessor 114 accesses from table 124 the digitally encoded indicia representative of that command, or status information, and instructs codec 118 to replace at least a portion of the selected picture with the previously generated indicia.

In either arrangement, the video signal containing the modified pictures can be transferred to display device 120 and decoded by a decoder included in display device 120 to generate a signal representative of an image including the on screen display. As the modified picture is displayed on the display device 120, the indicia in the modified picture can be displayed as well. The overall operation of the invention will be discussed in greater detail below.

Figure 2:
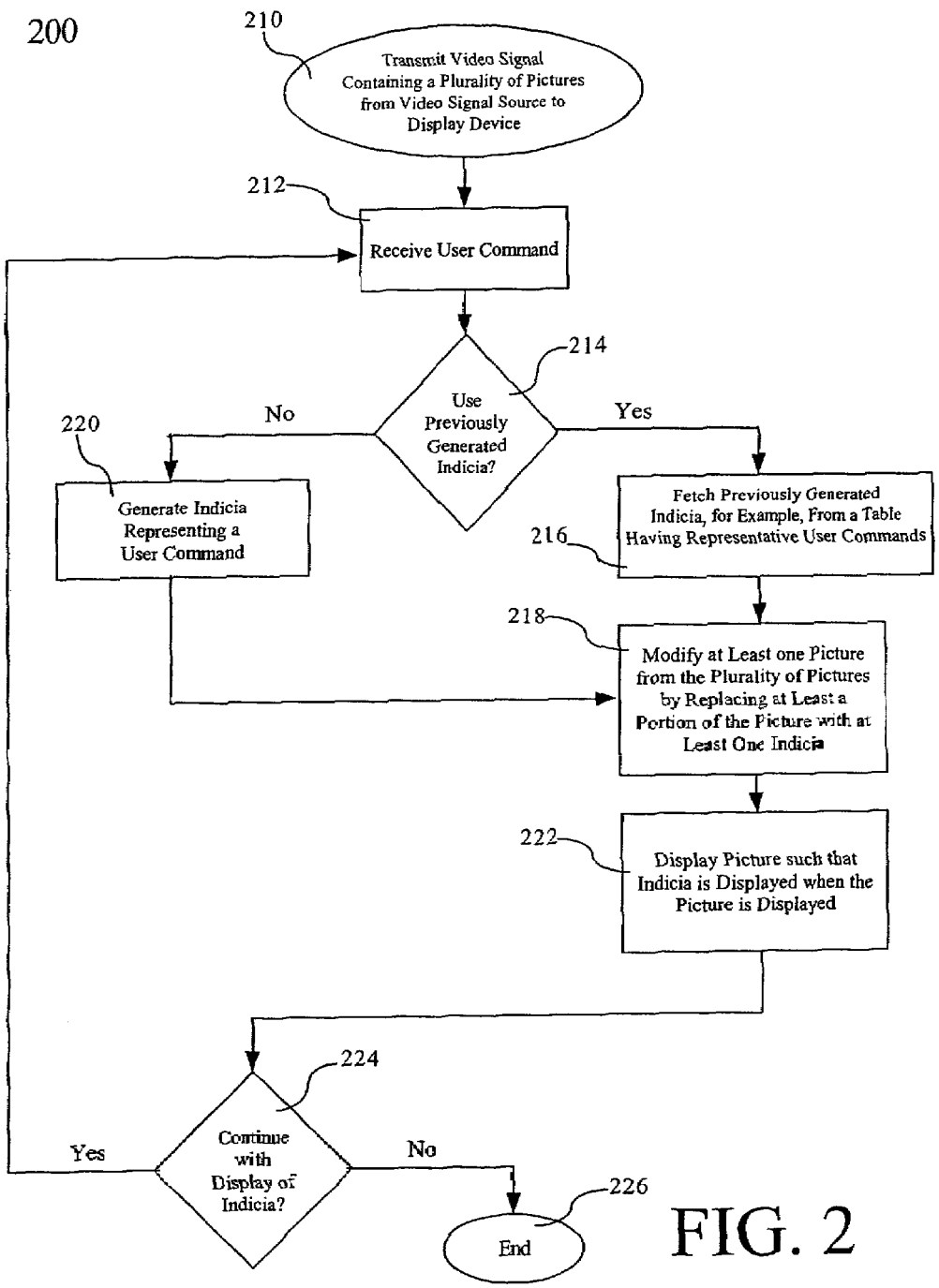
FIG. 2 is a flow chart that illustrates an operation of generating a user interface for digital televisions in accordance with the inventive arrangements.

FIG. 2 illustrates a flowchart 200 that demonstrates one way in which a user interface for a digital television can be generated. At step 210, a video signal containing a plurality of pictures can be transmitted from a video signal source to a display device. In one arrangement, the video signal can be a digitally encoded video signal read from a storage medium contained in the video signal source. In addition, the display device can be remotely located from the video signal source such that the display device is a separate entity in relation to the video signal source. Moreover, the display device can include its own decoder so that at least a portion of the digitally encoded signal is decoded in the display device.

At step 212, a user command is received. At decision block 214, if a previously generated indicia representative of the user command is not to be used for purposes of displaying that indicia, then the flowchart 200 continues at step 220. As shown at step 220, a digitally encoded indicia representative of the user command, or status information, can be generated. This type of generation can be referred to as generating indicia "on the fly." Alternatively, if previously generated indicia is to be used, then a previously generated indicia representative of the user command can be fetched from a table, for example, as shown at step 216. At step 218, at least one picture from the plurality of pictures in the video signal is modified by replacing at least a portion of the picture with the indicia, whether previously generated or generated on the fly. Thus, if the indicia is generated on the fly, then the generating step (step 220) and the modifying step (step 218) can be performed as the digitally encoded video signal is read from the storage medium. If the indicia was previously generated, the modifying step (step 218) can also be done as the signal is read, however, the generating step (step 216) can be performed prior to the digitally encoded video signal being read from the storage medium.

At step 222, the modified picture (now containing the indicia representing the user command) is decoded by a decoder in the display device such that the modified picture can be displayed such that the on screen display indicative of the user command, or status information, is displayed as the picture is displayed. At decision block 224, if the display of the indicia is to continue, then the process of generating a user interface can continue at step 212. If not, flowchart 200 stops at step 226. Thus, according to the inventive arrangements as discussed in the flowchart 200, a user can see any user commands or status displays generated by the reader/player, whether automatically initiated or user initiated.

Turning back to the generating steps (steps 220 and 216) and the modifying step (step 218), in one arrangement, at least a portion of the indicia, whether is previously generated or generated on the fly, can be comprised of macroblocks. As an example, these macroblocks can be intra (I) macroblocks. These I macroblocks can be used to replace the portion of the picture being replaced. It is understood, however, that the invention is not limited in this regard, as the indicia can be any other suitable form of data that can be inserted into a picture for purposes of representing a user command. In another arrangement, the picture which is to be modified at step 218 is a bi-directional predictive (B) picture. Modifying B pictures in accordance with step 218 can reduce the effects of any artifacts that may appear in the display of the modified picture, as none of the pictures in the video signal are typically predicted from B pictures. Notably, however, the invention is not limited in this regard, as other pictures such as I and predictive (P) pictures can also be modified in accordance with the inventive arrangements.

The following discussion illustrates an example of how a picture can be modified such that an indicia can be inserted in the picture and displayed. As will be explained below, this discussion may apply to I, P and B pictures. This example, however, will focus primarily on how a B picture can be modified. The B pictures in the video signal can be MPEG based pictures and, as such, can have a plurality of slices. In addition, each slice can contain a plurality of macroblocks. For purposes of the invention and to minimize confusion, these macroblocks will be referred to as picture macroblocks. Notably, the portion of the B picture that is replaced by the macroblocks that comprise the indicia can be a predetermined number of the plurality of picture macroblocks in at least one of the plurality of slices. It is understood that the picture macroblocks in the B picture that are replaced by the macroblocks that comprise the indicia can be any type of macroblock.

Figures 3A, 3B:
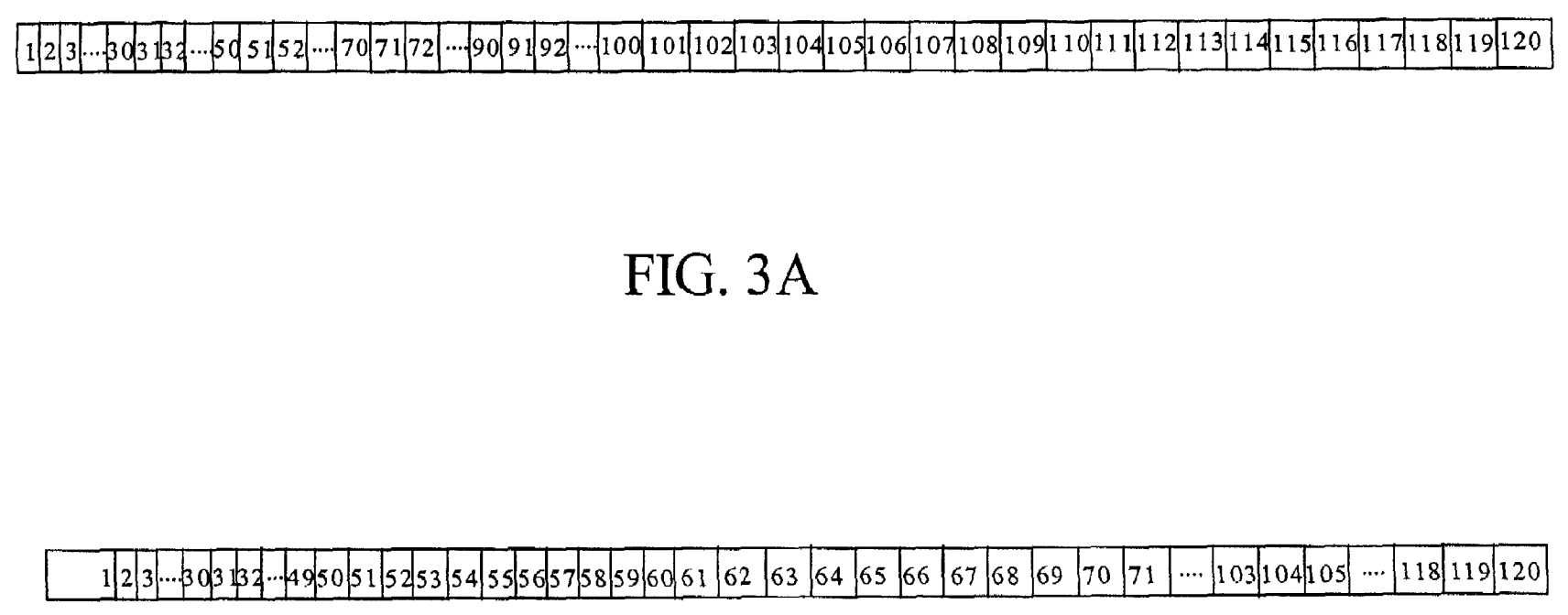

FIGS. 3A-3B can help explain how the B pictures can be modified. FIG. 3A shows an example of a slice in a B picture containing 120 picture macroblocks, a standard that is prevalent in many pictures that are displayed in a digital television. It is understood, however, that the method is not limited to this format, as other suitable picture standards can be used to practice the invention. These picture macroblocks can be referred to as original picture macroblocks. In one arrangement, the predetermined number of the original picture macroblocks that will be replaced by the macroblocks that comprise the indicia can be a segment of picture macroblocks in which the last original picture macroblock to be replaced is the last picture macroblock contained in the slice. As an example, at least a portion of the macroblocks that comprise the indicia can replace the last twenty original picture macroblocks of the slice shown in FIG. 3A. Thus, original picture macroblocks 101 through 120 of the slice can be replaced by at least a portion of the macroblocks that comprise the indicia. The above example applies whether the indicia was generated on the fly or previously generated.

In addition, to facilitate the replacement of the original picture macroblocks in the B picture, at least a portion of each of the original picture macroblocks in the slice, at least up to the last original picture macroblock that will not be replaced, can be decoded for purposes of determining the location in the slice where the indicia's macroblocks are to be placed. For instance, continuing with the example, at least a portion of original picture macroblocks 1 through 100 can be decoded. This decoding step can assist in locating the position in the slice where the indicia's macroblocks are to be positioned. In one arrangement, this location can be a predetermined default location. In another arrangement, this location can be a location to be selected by the user. It is preferred to replace the original picture macroblocks in accordance with the above discussion, i.e., such that the indicia macroblocks are at the end of the slice, as no other picture macroblock will be predicted from the indicia macroblock located at the end of the slice.

It is understood, however, that the invention is not limited to this particular manner, as the indicia macroblocks may be inserted at any location in the slice. FIG. 3B shows an example of how a number of indicia macroblocks can be placed in the slice such that the last macroblock in the slice is an original picture macroblock. Although the basic replacement step is the same, there are several slight differences between the modifying step of FIG. 3A and the modifying step of FIG. 3B. In this example, original picture macroblocks 50 through 70 can be replaced by at least a portion of the macroblocks that comprise the indicia. As the last macroblock in the slice is not an indicia macroblock, the original picture macroblock (macroblock 71) adjacent to the last indicia macroblock (macroblock 70) can be modified, if necessary, to reduce the possibility of a problem with subsequent picture macroblock predictions. This modification process can depend on whether certain original picture macroblocks are I macroblocks.

Continuing with the example, at least a portion of the original picture macroblocks 1 through 71 of the slice shown in FIG. 3B can be decoded. In one arrangement, the portion of the original picture macroblocks to be decoded can be the motion vectors present in each picture macroblock. Similar to the process described in FIG. 3A, this decoding step can help locate the desired position in the slice where the indicia macroblocks can be placed. Moreover, this decoding step can also determine which of the original picture macroblocks are I macroblocks. In this example, if it is determined that original picture macroblock 70 or original picture macroblock 71 are I macroblocks, then the original picture macroblocks 50 through 70 can be replaced by at least a portion of the indicia's macroblocks, and it is unnecessary to modify any of the remaining original picture macroblocks to ensure proper subsequent predictions.

If, for purposes of this example, original picture macroblocks 70 and 71 are non-I macroblocks, then the original picture macroblock adjacent to the last indicia macroblock (macroblock 71) can be modified. In one arrangement, original picture macroblock 71 can be reencoded such that the motion vector of original picture macroblock 71 is reset to its actual value, not the value from which it was initially predicted. As a result, subsequent predictions from original picture macroblock 71 will not be altered by the replacement of the original picture macroblocks with the indicia's macroblocks. It is understood that the invention is not limited to the examples as discussed in-relation to FIGS. 3A and 3B. In fact, the B pictures can be modified in any other suitable way such that at least a portion of the picture can be replaced with an indicia representative of a user command thereby resulting in the indicia being displayed as the picture is displayed. In addition, any suitable number of original picture macroblocks in any suitable number of slices in any number of pictures can be replaced by the desired indicia macroblocks.

Also, the invention is not merely applicable to B pictures. Specifically, the processes as described in FIGS. 3A and 3B can apply to P pictures as well. The invention can also be practiced on I pictures; however, the step of modifying any original picture macroblocks (as discussed in relation to FIG. 3B) is typically unnecessary, as generally all the original picture macroblocks in an I picture are I macroblocks. The invention is also applicable to dummy B and dummy P pictures. These pictures may be present in the video signal, particularly during a user command such as a trick mode.

Although the present invention has been described in conjunction with the embodiments disclosed herein, it should be understood that the foregoing description is intended to illustrate and not limit the scope of the invention as defined by the claims.

What is claimed is:

1. A method of generating a video signal having indicia representative of a user command, or status information associated with a playback or recorder device, with a plurality of digitally encoded pictures, the method comprising the steps of:
   receiving a digitally encoded video signal having a plurality of pictures;
   generating a digitally encoded indicia representing the user command or status information, wherein at least a portion of the digitally encoded indicia comprises intra macroblocks;
   modifying at least one picture from the plurality of pictures by replacing at least a portion of the digitally encoded signal with the digitally encoded indicia comprising intra macroblocks such that the indicia can be decoded and displayed when the picture is decoded and displayed by a remote display device; and
   transmitting the digitally encoded video signal including the modified picture to the display device.

2. The method according to claim 1, wherein receiving step comprises the step of reading the digitally encoded video signal from a storage medium, wherein said generating step and said modifying step are performed during said reading step.

3. The method according to claim 2, wherein the digitally encoded indicia is MPEG encoded.

4. The method according to claim 3, wherein the picture is a bidirectional predictive picture containing a plurality of slices, wherein each slice contains a plurality of picture macroblocks.

5. The method according to claim 4, wherein the portion of the bidirectional predictive picture that is replaced by the intra macroblocks that comprise the indicia is a predetermined number of the plurality of picture macroblocks in at least one of the plurality of slices.

6. The method according to claim 5, wherein at least one of the plurality of picture macroblocks in at least one of the plurality of slices, which is replaced by one of the intra macroblocks that comprise the indicia, is located at the end of that picture macroblock's corresponding slice.

7. The method according to claim 1, wherein the receiving step comprises the step of reading the digitally encoded signal from a storage medium, wherein said generating step is performed prior to said reading step and said modifying step is performed during said reading step.

8. The method according to claim 7, wherein the digitally encoded indicia is stored in a table to be accessed during said modifying step.

9. The method according to claim 8, wherein the picture is a bidirectional predictive picture containing a plurality of slices, each slice containing a plurality of picture macroblocks.

10. The method according to claim 9, wherein the portion of the bidirectional predictive picture that is replaced by the intra macroblocks that comprise the indicia is a predetermined number of the plurality of picture macroblocks in at least one of the plurality of slices.

11. The method according to claim 9, wherein at least one of the plurality of picture macroblocks in at least one of the plurality of slices, which is replaced by one of the intra macroblocks that comprise the indicia, is located at the end of that picture macroblock's corresponding slice.

12. An apparatus for generating and sending encoded digital video signals representative of a plurality of pictures to a remote display device having a decoder therein for decoding and displaying the encoded digital video signal, the apparatus comprising:
   a signal input for receiving a digitally encoded video signal representative of a plurality of pictures;
   a generator for generating a digitally encoded indicia representing a user command, or status information associated with the apparatus, wherein at least a portion of the digitally encoded indicia comprises intra macroblocks;
   a processor, coupled to the generator for modifying, in response to the user command, or an event that requires displaying the status information, at least one picture from the plurality of pictures in the encoded digital video signals by replacing at least a portion of the digitally encoded video signal with the digitally encoded indicia comprising intra macroblocks such that the indicia is decoded and displayed when the picture is decoded and displayed on the display device; and
   a signal output for transmitting an output signal including the digitally encoded video signal having the modified picture to the remote display device.

13. The apparatus according to claim 12, wherein the digitally encoded indicia is MPEG encoded.

14. The apparatus according to claim 13, wherein the picture is a bidirectional predictive picture containing a plurality of slices, wherein each slice contains a plurality of picture macroblocks.

15. The apparatus according to claim 14, wherein the portion of the bidirectional predictive picture that is replaced by the intra macroblocks that comprise the digitally encoded indicia is a predetermined number of the plurality of picture macroblocks in at least one of the plurality of slices.

16. The apparatus according to claim 15, wherein at least one of the plurality of picture macroblocks in at least one of the plurality of slices, which is replaced by one of the intra macroblocks that comprise the digitally encoded indicia, is located at the end of that picture macroblock's corresponding slice.

17. The apparatus according to claim 15, further comprising a table, and wherein the digitally encoded indicia is stored in the table and the processor is further programmed to access the table during the modifying operation.

* * * * *